Patented June 24, 1930

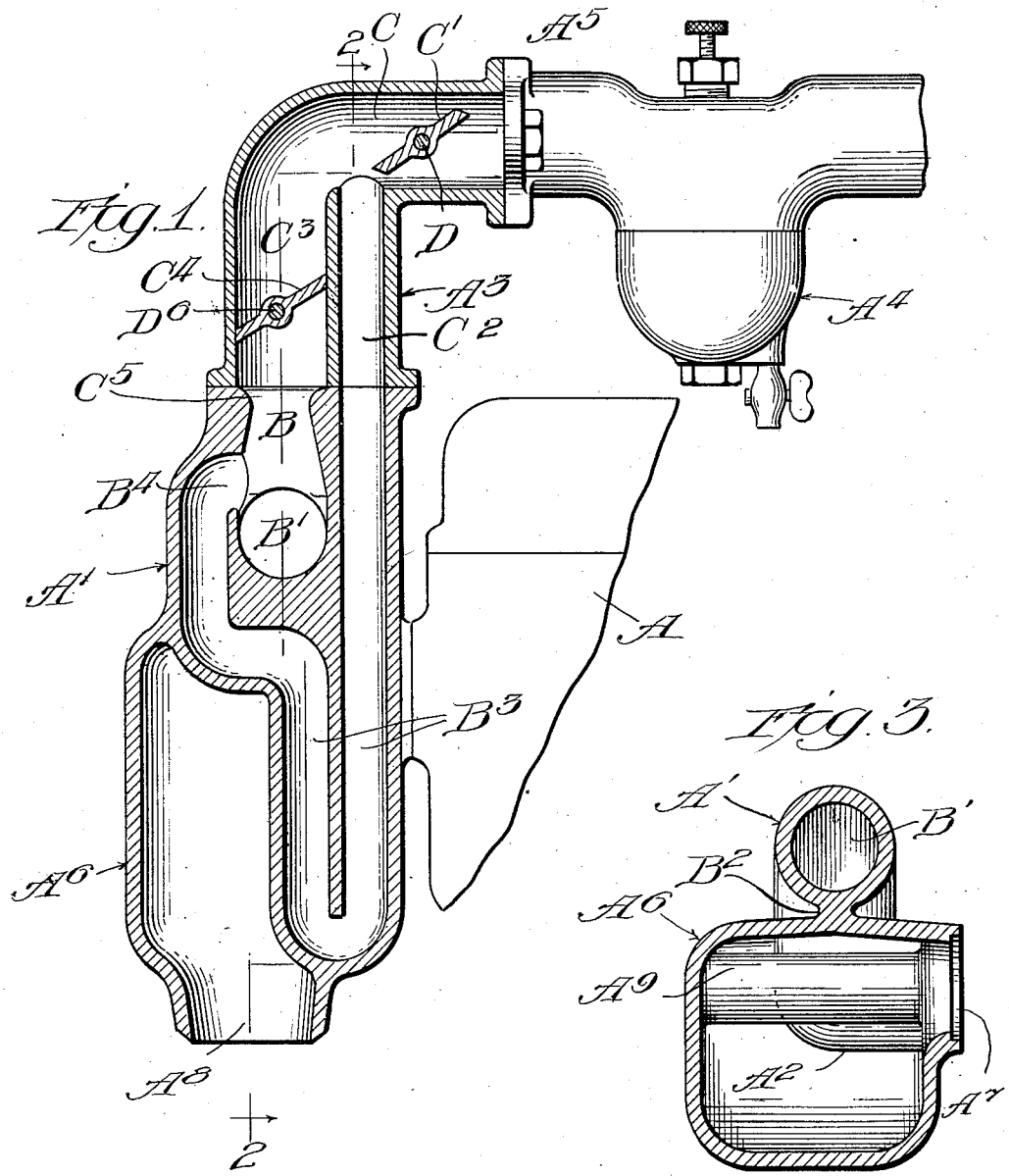

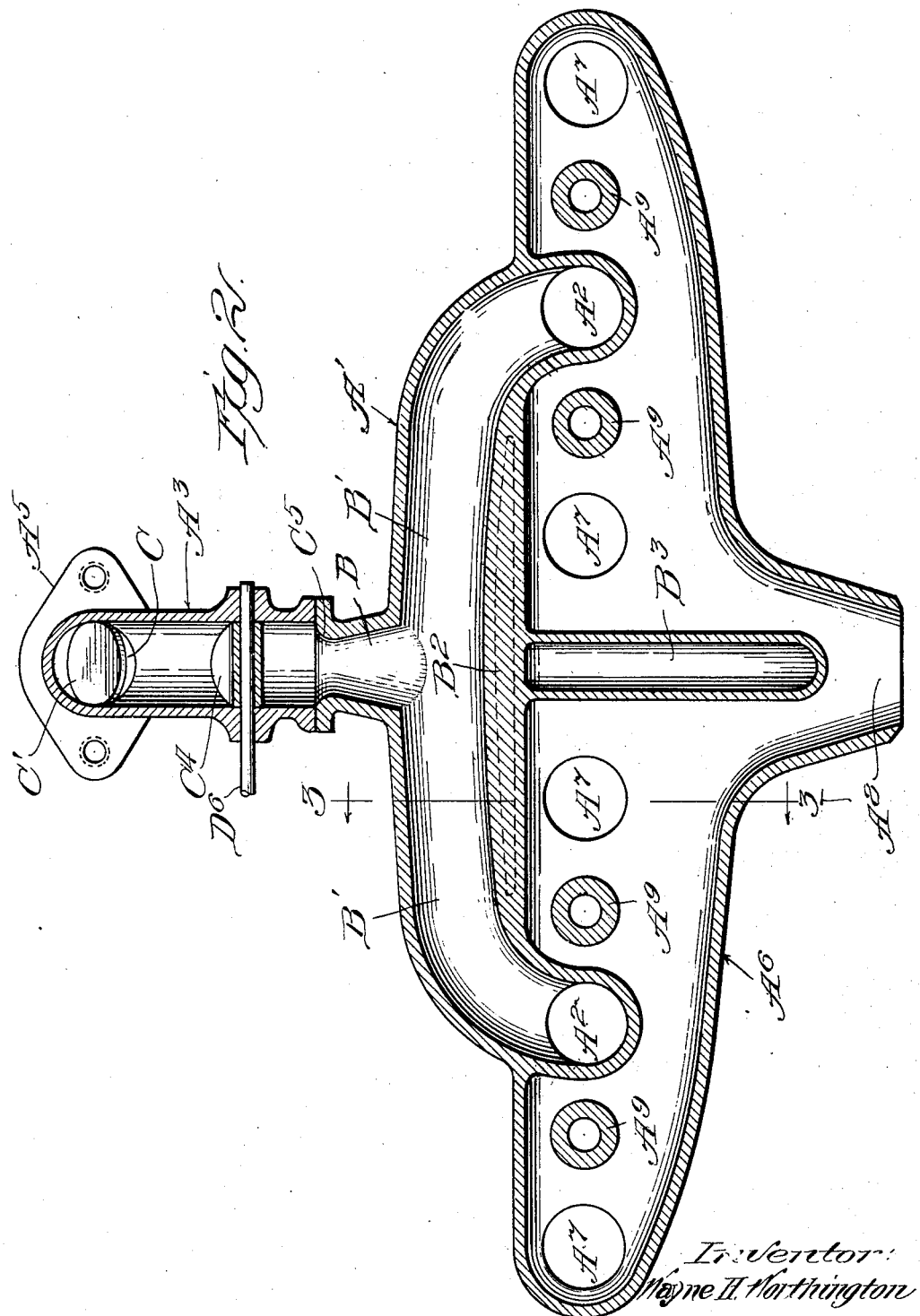

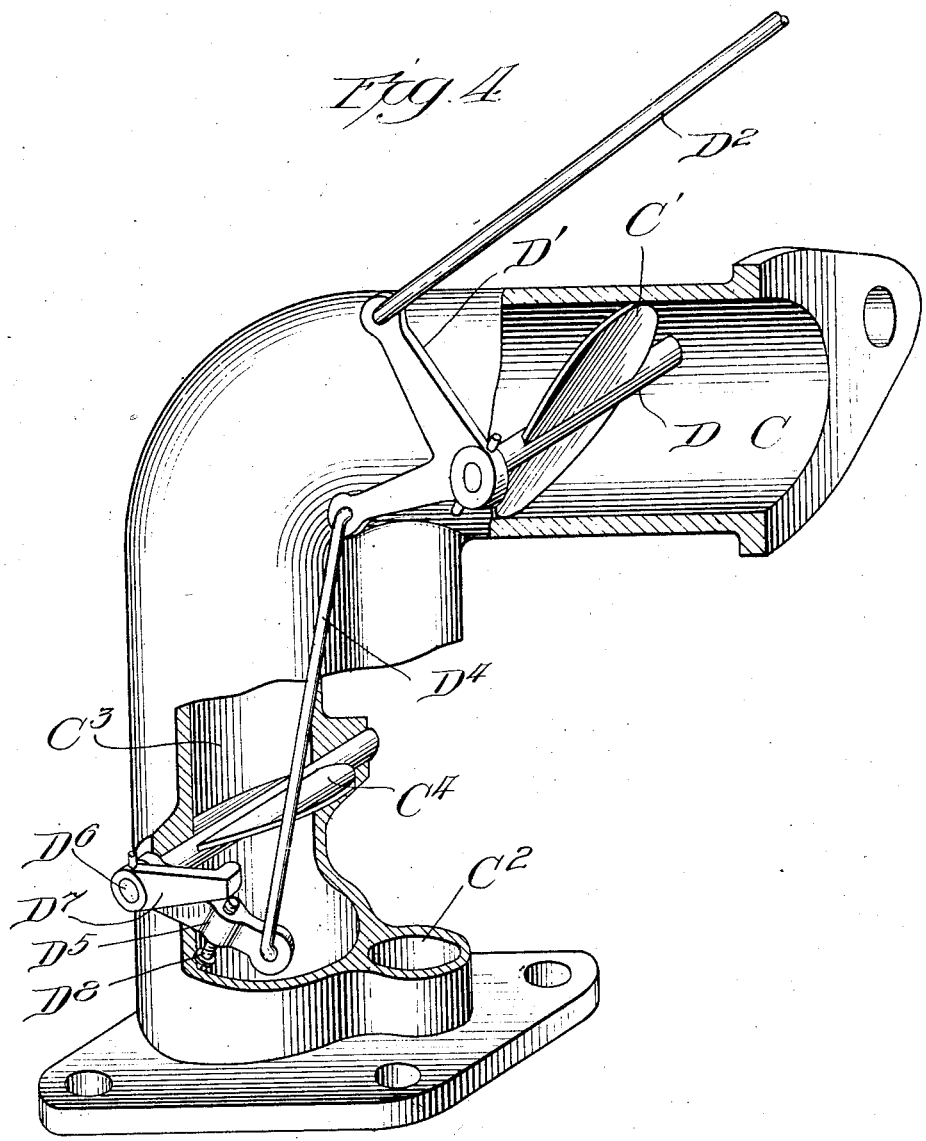

1,767,031

UNITED STATES PATENT OFFICE

WAYNE H. WORTHINGTON, OF BATTLE CREEK, MICHIGAN

INTAKE MANIFOLD

Application filed March 20, 1925. Serial No. 16,876.

My invention relates to improvements in intake manifold for internal combustion engines and method of preparing combustible mixtures, and is directed to the idea of progressively heating the combustible mixture in a controlled and variable manner depending upon engine requirements so as to provide a combustible mixture which, when it reaches the engine cylinder, will have many of the characteristics of a gaseous fuel as distinguished from the characteristics of a liquid fuel.

Cooperating to carry out the proper heat treatment of the liquid, I make use of turbulence in a novel manner so as to insure that every particle of atomized liquid fuel in the mixture will receive heat treatment.

I propose to subject the fuel to a gradually, progressively, increasing temperature so that during the passage of this fuel through the heated zone, the components of the liquid will be gradually boiled off as they reach the zone where the temperature is appropriate for these results. There will thus be a zone ranging in temperature from the lowest temperature calculated to gasify or vaporize the lighter fuel fractions without disassociation or cracking, to the highest temperature, calculated to gasify or vaporize the heavier fractions, and all fractions between will be taken care of by the gradually increasing temperature of the zone as they progress through it. Such zones must also be of a range sufficient to progressively heat the fuel, regardless of whether the heat is applied thereto either by conduction, or radiation, or both.

Since the velocity is high and since the time during which any fuel particle is subjected to heat is exceedingly short, some means are necessary for insuring that each liquid fuel particle be brought into intimate contact with the heating element or heating surface and I propose, therefore, to provide means for setting up an unusually violent turbulence in the intake manifold so as to insure that during the passage through the heated zone substantially all liquid particles in the combustible mixture will be brought into contact or at least close juxtaposition to the heated surface. Such turbulence further provides a means for heating the interior of the mixture stream within the exceedingly short time available for such heating. I propose to obtain this turbulence by dividing the combustible mixture into a plurality of streams or jets and causing these jets to impinge on one another along sharply inclined paths. For instance, in the preferred form, there is provided a main current or channel for the combustible mixture and a by-pass which may or may not be of smaller cross sectional area which discharges back into the main channel at right angles thereto. The impinging of these two streams, traveling as they do at high velocities sets up the most violent turbulence and thus insures that from then on all particles of the liquid suspended in the air will be brought into sufficiently intimate contact with the heated surface.

There is also provided means whereby the temperature of the heated mixture may be controlled or regulated in correlation with the engine demand, to prevent too cool a mixture under conditions of reduced volumetric requirements or an excessively heated mixture under conditions of increased volumetric requirements. This is accomplished by applying different degrees of heat at various branches of the intake manifold and by differentially controlling the proportions of mixtures passing through the various branches. Other objects will appear from time to time throughout the specification and claims.

This invention is illustrated more or less diagrammatically in the accompanying drawings, wherein:

Figure 1 is a vertical transverse section through the intake and exhaust manifold showing the engine and carburetor in elevation;

Figure 2 is a section along the line 2—2 of Figure 1;

Figure 3 is a section along the line 3—3 of Figure 2;

Figure 4 is a perspective showing parts in section and parts broken away to illustrate the operation of the control mechanism.

Like parts are indicated by like characters throughout the specification and drawings.

A is the engine block containing the usual cylinders, valves and working mechanisms. Associated with this engine block is a combined intake and exhaust manifold $A^1$. This manifold is adapted to be clamped or bolted to the side of the engine block in any suitable manner not here illustrated and discharges in the form here illustrated into the engine block through the two spaced ports $A^2 A^2$, the combustible mixture being carried to these cylinders by any suitable passage not here shown. Bolted to the top of this manifold is a control housing $A^3$ which carries the carburetor $A^4$ in the usual manner, bolted to a carburetor flange $A^5$. Integral with the intake manifold is the exhaust manifold $A^6$ adapted to receive the exhaust from the engine through the exhaust ports $A^7$ and discharge the burnt gases through the exhaust ports $A^8$ into any suitable exhaust pipe as indicated. $A^9 A^9$ are sleeves extending through the exhaust chamber to permit passage of the holding bolts which hold the manifold in place against the engine block without permitting the uncontrolled escape of the products of combustion.

It will be noted that the Venturi passage B at the intake end of the intake or induction passage discharges into two branch passages $B^1 B^1$ which lead to the ports $A^2$. The walls of these branch passages are heated by conduction through the web $B^2$ leading from the walls of the exhaust chamber to the walls of the intake passages adjacent to the point where the venturi discharges. But further on as the gases progress through the passages $B^1$ toward the ports $A^2$, a point is reached where the wall of the passage is all that separates the burnt exhaust gases from the ingoing fuel mixture and thus there is a progressive increase in the temperature of the wall of the intake passages from the point at which combustible mixture is received in the intake passage to the point at which it is discharged to the engine. $B^3$ is a U-shaped primary induction passage extending down along the outside wall of the exhaust manifold and then back up through the air heated by the exhaust gas and discharging at $B^4$ into the passage B at right angles to its axis just before it discharges into the two branches $B^1$. Thus the mixture coming in through the passage $B^3$ is discharged into the main stream coming into the passage $B^1$ at right angles.

Enclosed within the control housing $A^3$ is a main mixture intake passage C controlled by a butterfly valve $C^1$. This main intake passage has two branches, one primary branch $C^2$ communicating with the passage $B^3$ immediately beyond the butterfly valve $C^4$ and discharging into the passage B through the venturi $C^5$ and thus the fuel laden air or combustible mixture is drawn in through the carburetor $A^4$ and is throttled by the valve $C^1$ and then divided finally through two separate parallel passages subject to different conditions of heat until the flow is rejoined immediately before entering the distribution branches of the manifold.

The valve $C^1$ is mounted on a valve stem D pivoted in the wall of the member $A^3$. Pinned to this stem is a bell crank lever $D^1$ to which is pivoted a throttle control stem $D^2$. The other arm of the bell crank lever is connected by means of the link $D^4$ to a lever $D^5$ floating on the valve stem $D^6$, which stem carries the valve $D^4$. $D^7$ is a lever keyed to the stem $D^6$. $D^8$ is an adjusting screw interposed between the levers $D^5$ and $D^7$ whereby the relation between the rotary movement of the stems D and $D^6$ may be adjusted so that a certain predetermined movement of the valve $C^1$ will take place before the valve $C^4$ will open. The valve $C^4$ is unbalanced so that the suction of the engine tends always to keep it closed except when positively opened by the operation of the linkage.

The construction of many carburetors is such that their ability to properly meter the fuel and air depends upon the functioning of a throttle valve built into the carburetor. When such carburetors are used, the inbuilt throttle of the carburetor may be utilized to replace the main throttle $C^1$, thereby effecting a reduction of the total number of parts required without altering the method of operation.

It will be evident that while I have shown in my drawings an operative device, still many changes might be made in the size, shape and disposition of parts without departing materially from the spirit of my invention and I wish, therefore, that my showing be taken as in a sense diagrammatic.

The use and operation of my invention are as follows:

With the throttle in the nearly closed position the distributing valve in the main air intake passage will be closed and all the combustible mixture will pass down through the primary induction passage or by pass, passing through the exhaust chamber to the intake branches and thence to the engine. The arrangement of parts is such that the cooler end of the primary passage will be toward the intake and the hotter end toward the discharge. When but a small amount of fuel is being fed to the engine, it will all pass in through this relatively small progressively heated passage. As the engine demand increases, however, and the throttle is further opened, a position will be reached at which the unbalanced distributing valve will commence to open, allowing some of the combustible mixture to be drawn directly in without passing through the primary induction passage. Such combustible mixture will enter the distribution branches of the intake manifold in the direction parallel with a Venturi axis instead of at right angles to it as in the case of mixture fed in by the primary passage. The impingement of these two streams of fuel laden air along sharply inclined paths to one another will set up a very violent eddying and whirling action which will both commingle and intermingle the relatively highly heated gases and will also set up a turbulence which will insure that a considerable proportion of the resulting mixture will at some time during its passage through the balance of the induction passage be thrown against the heated walls thereof.

By the arrangement shown it will be noted that I propose to treat the combustible mixture taken from the carburetor in two separate areas. One area or zone or chamber heats a part of the mixture to a very high heat, another zone tempers this by providing for mixing a relatively cool combustible mixture and then heating the resulting mixture before entering the engine. This results in giving a relatively long time during which heating of the mixture can take place and at the same time provides the necessary degree of turbulence to simultaneously establish mixing and commingling of the fuel and air together with adequate heating.

The sudden expansion of the mixture passing out of the venturi tends of itself to set up turbulence, and in this way renders more effective the action of the heated mixture stream entering from the primary passage.

The turbulence of the mixture heats it throughout and prevents the passage of the mixture through the passages with the outer layers only being heated, and the entire mixture, following the setting up of the condition of turbulence, is heated progressively until the temperature necessary to establish any desired condition of dryness is obtained.

The temperature of the intake charge may be maintained at any desired point irrespective of throttle opening by properly proportioning the size of the two parallel intake passages and the angular relation of the throttle and control valves. The time during which the fuel or mixture remains in contact with the heater induction passage walls increases as the speed of the engine decreases, owing to the choking off of the larger passage, and the result is that the fuel or mixture is able to attain a higher temperature for reduced loads, if that is desired, even through the temperature of the exhause gases may be lowered. The decreased velocity results, of course, in a decrease in turbulence, but this increase in temperature counterbalances such decrease in turbulence.

There is at all times a sufficient flow of mixture through the auxiliary or by-pass intake passage to provide a sufficient degree of turbulence to prevent separation of the fuel particles from the mixture stream. When the fuel is carried in suspension within the mixture stream the temperature of the passage wall may be carried very high, and since the heat enters the mixture stream by radiation, the actual heating of the mixture is very gradual.

I claim:

1. A fuel supply means for internal combustion engines, comprising an air mixing or metering means, a mixture intake passage leading therefrom, a plurality of mixture passages arranged in parallel, adapted to receive the mixture from the first mentioned passage and adapted subsequently to join and to direct their respective streams together along sharply converging paths, a single mixture passage adapted to receive both streams and to discharge the mixture to the engine, and a venturi in one of said parallel passages, positioned adjacent their junction, said single passage being sharply inclined to both said parallel passages.

2. A manifold for internal combustion engines comprising a primary passage terminating in a Venturi tube, a by pass exposed to the heat of the engine and communicating at one end with the primary passage, discharging at the other end adjacent the venturi, in a direction perpendicular to the axis thereof and a secondary mixture passage into which the venturi discharges at right angles thereto.

3. A manifold for internal combustion engines comprising a primary passage terminating in a Venturi tube, a by pass exposed to the heat of the engine and communicating at one end with the primary passage, discharging at the other end adjacent the venturi, in a direction perpendicular to the axis thereof, and a secondary mixture passage into which the venturi discharges at right angles thereto, a control valve in the primary passage between the venturi and the point at which the by pass leaves the primary passage, a throttle valve in the primary passage between the intake end thereof and the by pass and immediately adjacent and adapted when it is in partially opened position to guide the mixture toward the by pass.

4. A manifold for internal combustion engines comprising a primary passage terminating in a Venturi tube, a by pass exposed to the heat of the engine and communicating at one end with the primary passage, discharging at the other end into the venturi, in a direction perpendicular to the axis thereof and a secondary mixture passage into which the venturi discharges at right angles thereto, a control valve in the primary passage between the venturi and the point at which the by pass leaves the primary passage, a throttle valve in the primary passage between the intake end thereof and the by pass, means for operating said valves in unison, adapted to open the control valve only after the throttle has opened a predetermined distance.

5. A manifold for internal combustion engines comprising a primary passage terminating in a Venturi tube, a by pass communicating at one end with the primary passage, discharging at the other end into the venturi, in a direction perpendicular to the axis thereof and exposed to the heat of the engine, and a secondary mixture passage into which the venturi discharges at right angles thereto, the temperature of the walls of the bypass increasing in the direction of flow of the mixture therethrough.

6. A manifold for internal combustion engines comprising a primary passage terminating in a Venturi tube, a by pass exposed to the heat of the engine and communicating at one end with the primary passage, discharging at the other end into the venturi, in a direction perpendicular to the axis thereof, and a secondary mixture passage into which the venturi discharges at right angles thereto, the secondary passage being also exposed to the heat of the engine.

Signed at Battle Creek, county of Calhoun and State of Michigan, this 9th day of March, 1925.

WAYNE H. WORTHINGTON.